R. A. BLUNCK.
STALK CUTTER.
APPLICATION FILED DEC. 1, 1913.
1,117,314.
Patented Nov. 17, 1914.
2 SHEETS—SHEET 1.
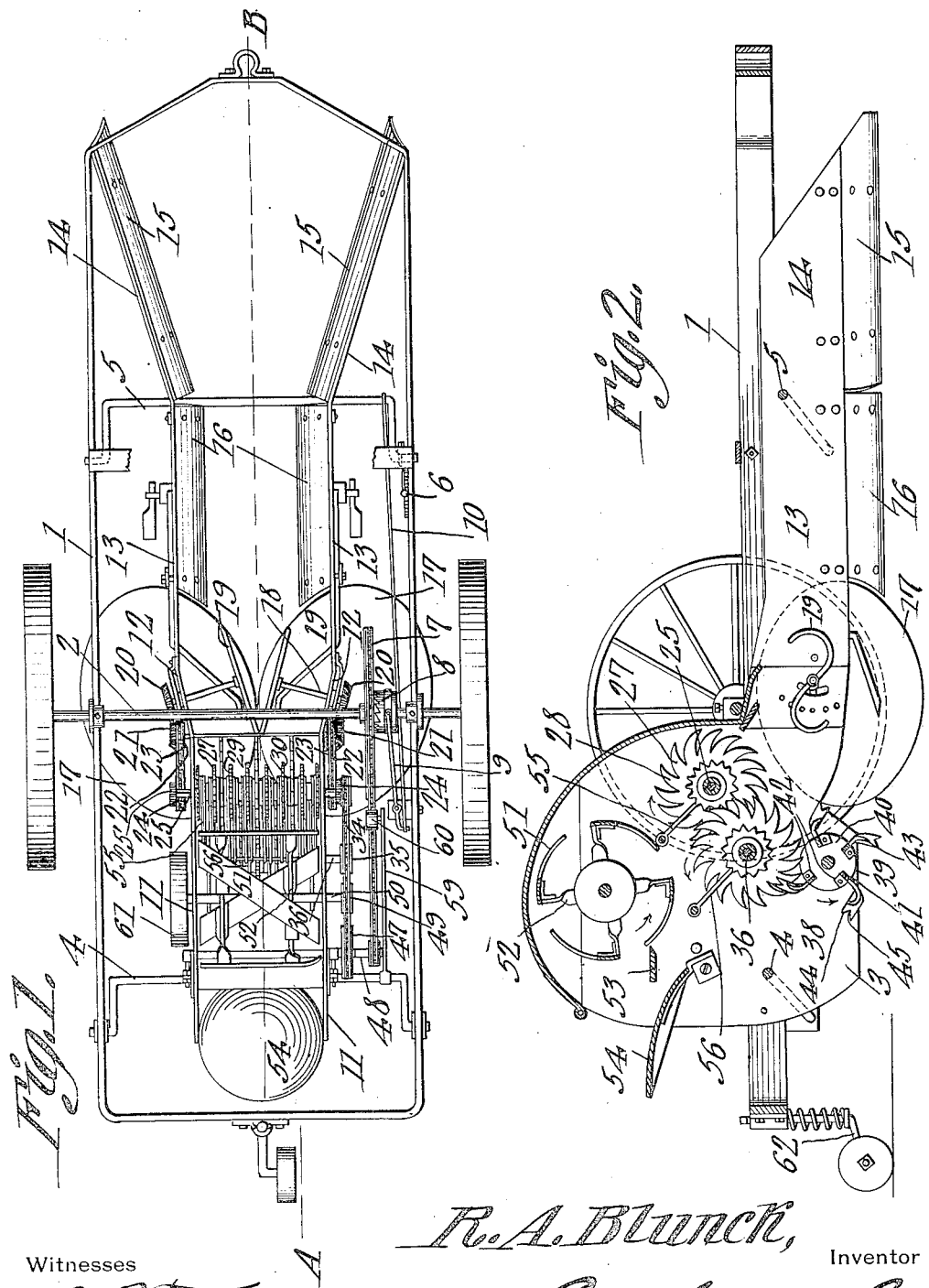
Witnesses
R. A. Blunck,
Inventor
by
Attorneys R. A. BLUNCK.
STALK CUTTER.
APPLICATION FILED DEC. 1, 1913.
1,117,314.
Patented Nov. 17, 1914.
2 SHEETS—SHEET 2.
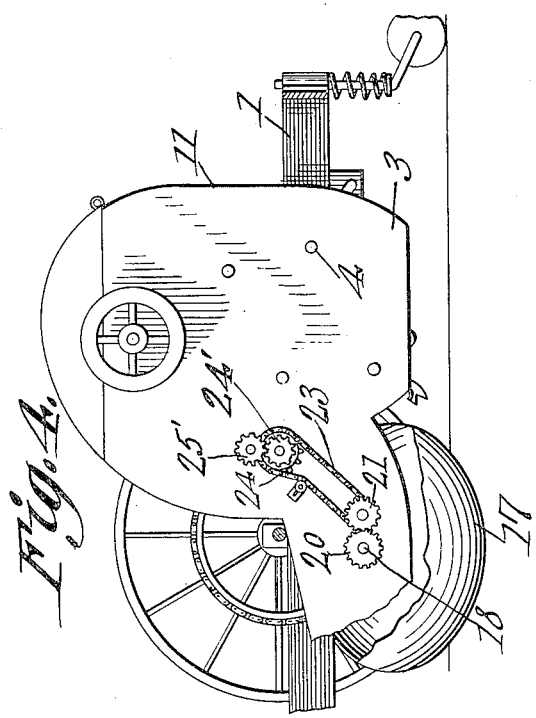
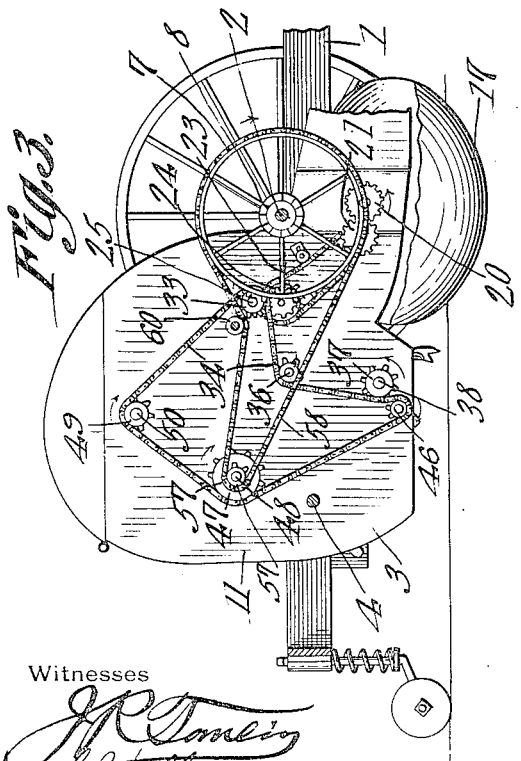
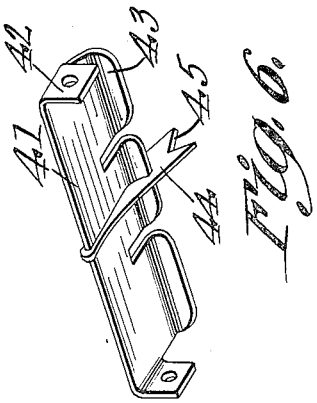
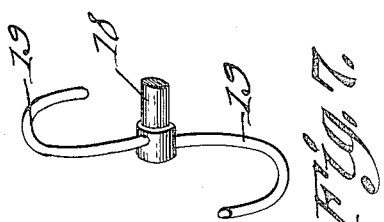
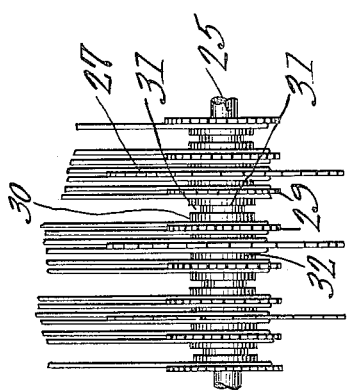
Witnesses
R. A. Blunck, Inventor
by ———— Attorneys

# UNITED STATES PATENT OFFICE.

ROBERT ADOLPH BLUNCK, OF GRAND MOUND, IOWA.

STALK-CUTTER.

1,117,314. Specification of Letters Patent. Patented Nov. 17, 1914.

Application filed December 1, 1913. Serial No. 804,048.

*To all whom it may concern:*

Be it known that I, ROBERT A. BLUNCK, a citizen of the United States, residing at Grand Mound, in the county of Clinton and State of Iowa, have invented a new and useful Stalk-Cutter, of which the following is a specification.

This invention relates to stalk cutters and is more particularly designed as an improvement upon the structure disclosed in my Patent No. 1,081,201.

One of the objects of the invention is to provide improved means for gathering the stalks and directing them end first to the shredding mechanism, the means employed for shredding being likewise improved and operating both to cut the stalks into longitudinal strips and to feed them to chopping mechanism.

A further object is to provide means whereby the roots of the stalks are engaged and elevated, thus to assist the wipers or elevating devices in directing the stalks to the shredding and comminuting devices.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine, the top of the housing being removed to show the shredding and adjacent mechanisms in plan. Fig. 2 is a central vertical section through the machine on line A—B Fig. 1. Fig. 3 is a side elevation of a portion of the machine and showing the drive mechanism employed. Fig. 4 is an elevation showing the opposite side of the machine and a portion of the drive mechanism. Fig. 5 is a front elevation of a portion of the shredding mechanism. Fig. 6 is a perspective view of one of the blades of the elevator. Fig. 7 is a perspective view of a wiper.

Referring to the figures by characters of reference 1 designates the main frame of the machine supported between its ends by a drive axle 2. A supplemental frame 3 is extended under the axle 2 and within the frame 1 and is connected to the main frame 1 by arched shafts 4 and 5, there being any suitable means, such as a lever 6, for rotating the shaft 5 and thus causing the supplemental frame 3 to be either raised or lowered within the frame 1. A large drive sprocket 7 is mounted loosely on the axle 2 and a clutch 8 is provided whereby this sprocket may be connected to or run separate from the axle. This clutch can be operated in any suitable manner. For example, it may be engaged by one end of a lever 9, the other end of which is connected, as by a rod 10, to the arched shaft 5 so that, when the shaft 5 is swung downwardly so as to lower the supplemental frame 3, rod 10 will pull on lever 9 and throw the clutch 8 into active position whereas, when the supplemental frame 3 is raised and shaft 5 correspondingly elevated, lever 9 will be shifted so as to disengage the clutch 8 from the sprocket 7. Obviously, by providing mechanism such as above described, the sprocket 7 will be automatically coupled to axle 2 when supplemental frame 3 is lowered and will be automatically uncoupled from the axle when the supplemental frame is raised. The supplemental frame 3 has parallel rear side walls 11 from which extend short forwardly diverging walls 12, these diverging walls merging into front parallel side walls 13, the forward ends of which have forwardly diverging wings 14. To these wings 14 are secured scrapers 15 and additional scraping blades or guides 16 are secured to the walls 13 and extend downwardly therefrom. The blades 15 and 16 coöperate to form a throat for the reception of the stalks to be reduced and extending into the back portion of this throat are downwardly converging concavo-convex disks 17 which may be mounted in any suitable manner, for example, as illustrated in my patent hereinbefore mentioned, these disks operating to dig into the ground and remove the roots of the stalks to be cut.

Journaled within the diverging portions 12 of the supplemental frame 3 are obliquely disposed shafts 18 converging forwardly and inwardly, each of these shafts being provided, at its inner end, with a substantially S-shaped spring wiper 19. Each of the shafts 18 has a gear 20 on its outer end, these gears receiving motion, through gears 21 which rotate with idler sprockets 22. Sprockets 22 receive motion through chains 23 from sprockets 24 having gears 24' which mesh with gears 25' secured to the shaft 25 of the upper shredding roll of the machine. As shown in Fig. 5, this shredding roll is made up of a series of large disks 27 having elongated curved teeth 28 curved in the direction of rotation of the roll and between every two disks 27 are interposed smaller toothed disks 29 constituting feeding disks. A spacing collar 30 having an annular groove 31 is interposed between the disks 29 of each pair and these disks 29 may be spaced in any suitable manner from the disks 27, as by means of collars 32. A sprocket 33 is secured to one end portion of shaft 25 and is adapted to transmit motion through a chain 34 to a sprocket 35 secured to the shaft 36 of a lower shredding roll. This lower shredding roll is of the same construction as the upper shredding roll with the exception that the toothed disks 28 thereof are arranged to project into the annular groove 31 in the upper shredding roll, while the teeth 28 of said upper roll are adapted to project into the groove 31 in the lower roll. The teeth of the disks 28 of the lower roll are curved oppositely to the corresponding teeth of the upper roll, this being due to the fact that the two rolls rotate in opposite directions and it is desirable to have the teeth on the disks 28 curved in the direction of rotation.

From the sprocket 35, the chain 34 extends downwardly into engagement with a sprocket 37 secured to the shaft 38 of a revoluble conveyer 39. This conveyer is made up of end disks or heads 40 secured to shaft 38 and connected by blades 41 disposed radially between the heads, each blade having terminal ears 42 for attachment to the heads and having outwardly extending curved tongues 43 along its longitudinal edge. These tongues are curved oppositely to the direction of rotation of the conveyer and that tongue located at the center of the blade is provided with a finger 44. This finger projects beyond the free end of the tongue, the said projecting end being forked as shown at 45 so as to constitute means for engaging the roots of a stalk, thereby to facilitate the elevation of the roots when the conveyer is rotating in the direction indicated by the arrow in Fig. 2.

From the sprocket 37 the chain 34 extends around an idler sprocket 46, and thence upwardly to a sprocket 47 secured to a counter shaft 48 journaled in the side walls 11 of the supplemental frame 3. The chain 34 then extends over a sprocket 49 secured to one end of the shaft 50. Secured on this shaft are obliquely disposed chopping blades 51, the same being connected to the shaft by radially disposed arms 52 and being adapted to coöperate with a stationary knife 53 whereby, as the stalks are fed between the knife 53 and the blades 51, they will be quickly reduced to a finely comminuted state. A spreading disk 54 is supported under the blade 53 so that the comminuted material when discharged from the blade 53 will fall on this disk and be spread laterally over the ground for use as a fertilizer. Upper and lower gratings 55 and 56 are supported in the supplemental frame 3, the bars of these gratings being extended between the disks 28 of the upper and lower shredding rolls and being disposed substantially parallel so as to produce a passage through which stalks will be guided from the shredding rolls to the chopping knives. A sprocket 57 is secured to shaft 48 and receives motion, through a chain 58, from the drive sprocket 7. An arm 59 extends forwardly from the rear arched shaft 4 and is mounted to rotate with the shaft. This arm carries an idler 60 which overhangs the chain 58 so that, when the supplemental frame 3 is swung downwardly and forwardly during the downward and forward swinging movement of the arched shaft 4, the arm 59 will swing downwardly, pressing the idler 60 against the chain and taking up the slack which is produced in the chain 58 during the movement of the shaft 54 toward axle 2. Should the supplemental frame 3 be swung upwardly and rearwardly, the operation will be reversed, the idler 60 moving away from the chain 58 so as to permit said chain to straighten out and thus allow for the increased distance between shaft 54 and axle 2.

It will be seen that during the forward movement of the machine while the supplemental frame 3 is in lowered position, the disks 17 will cut into the soil and dig up the roots of the stalks and while the rotating wipers 19 are engaging the stalks and elevating them, the conveyer blades 41 will press against the butt ends of the stalks and lift them, the fingers 44 at the same time biting into the roots so as to facilitate this lifting action. The stalks will be elevated to the teeth on the disks 28 of the lower shredding roll and these teeth will direct the butt ends of the stalks into the passage between the two shredding rolls where the stalks will be engaged by the disks 28 and shredded longitudinally, disks 29 at the same time engaging the stalks and feeding them rearwardly between the gratings 55 and 56 and onto the stationary blade 53. Here the stalks will be reduced to a finely comminuted state by the rotating blades 51 and the material thus produced will be spread over the plate 54 and directed onto the ground. The wipers 19 operate to gather the stalks and to direct them rearwardly thus to coöperate with the conveyer to elevate the stalks to the shredding rolls. As the wipers are made of spring material they will yield whenever necessary to properly engage the stalks.

As shown in the drawings a fly wheel 61 can be connected to the counter shaft 48 and the rear end portion of the main frame 1 can be supported by a caster 62.

What is claimed is:—

1. In a stalk cutter the combination with shredding mechanism, of means for gathering stalks and elevating them to the shredding mechanism, said means including spaced oppositely disposed arms arranged in pairs, said pairs converging rearwardly, the arms of each pair being oppositely disposed and curved in the plane of rotation, and means for rotating the arms.

2. A stalk cutter including shredding mechanism, oppositely disposed rearwardly converging pairs of stalk engaging and elevating arms, the arms of each pair lying in the same plane being oppositely disposed and curved opposite to the direction of rotation, and means for rotating said arms to gather and elevate the stalks to the shredding mechanism.

3. The combination with shredding mechanism, and means for actuating the mechanism, of a revoluble series of conveyer blades below the shredding mechanism, root engaging fingers extending from the blades, and revoluble means in front of the conveyer blades and shredding mechanism for gathering and elevating the stalks engaged by the conveyer blades, said conveyer and gathering means coöperating to direct the stalks endwise to the shredding mechanism.

4. In a machine of the class described, a revoluble series of conveyer blades, root engaging fingers extending from the blades, and revoluble means in front of the conveyer blades for gathering and elevating the stalks engaged by the conveyer blades, said conveyer and gathering means coöperating to deliver the stalks endwise.

In testimony that I claim the foregoing as my own, I have hereto affixed my signature in the presence of two witnesses.

ROB'T ADOLPH BLUNCK.

Witnesses:
 VIRGIL R. NORTHROP,
 OTTO V. WILLE.